(No Model.)
G. U. MEYER.
PLATED METAL.
No. 431,848. Patented July 8, 1890.
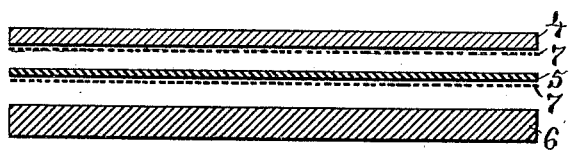
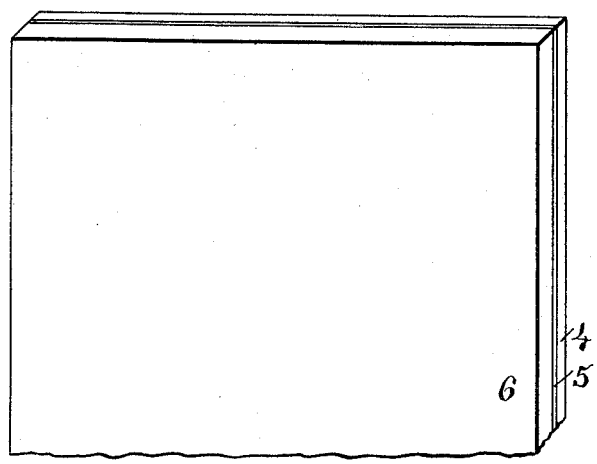
WITNESSES:
Chas. H. Luther Jr.
M. F. Bligh.
INVENTOR:
George U. Meyer
by Joseph A. Miller &Co.
Attys.

UNITED STATES PATENT OFFICE.

GEORGE U. MEYER, OF PROVIDENCE, RHODE ISLAND.

PLATED METAL.

SPECIFICATION forming part of Letters Patent No. 431,848, dated July 8, 1890.

Application filed May 15, 1890. Serial No. 351,930. (No model.)

*To all whom it may concern:*

Be it known that I, GEORGE U. MEYER, of the city and county of Providence and State of Rhode Island, have invented a new and useful Improvement in Plating Metals; and I hereby declare that the following is a full, clear, and exact description of the same, reference being had to the accompanying drawings, forming part of this specification.

In various branches of the arts metal is frequently covered or plated with other metal. One method consists in securing the desired metals together by solder. In the manufacture of jewelry a sheet or block of inferior metal is usually covered on one or both sides with precious metal, the two metals being secured together by solder. The plated sheet or block is then drawn down between rollers to a thin plate, which is known in the jewelers' art as "stock-plate." It is essential that the union between the two metals be perfect and of such strength that in the process of rolling between rolls the two metals will not separate. To secure this union, a solder of great strength, which will flow at a temperature below the fusing-point of either of the two metals, is used. This hard solder has heretofore been flushed onto the block of inferior metal, the precious metal was clamped onto the soldered surface of the base metal, and the whole subjected to the heat of a furnace, by which the solder was fused with the metals, and thus the precious metal was united to the base metal. In flushing the block or sheet of base metal with solder, the solder is not uniformly distributed over the surface, the plating metal is not uniformly secured to the block or sheet, the smallest defect, when the plated block or sheet is rolled out into a thin strip, is enlarged, and considerable portions of the finished stock-plate have to be cut out.

My invention relates to an improvement by which these defects are avoided; and it consists in securing a sheet of hard solder by a softer solder, as will be more fully set forth hereinafter.

Figure 1 is a sectional view showing the plating-sheet, the stock-sheet, the sheet of hard solder, and the softer solder before they are united. Fig. 2 is a perspective view of a plated ingot or sheet.

In the drawings, the number 4 indicates the sheet of plating metal; 5, the sheet of hard solder; 6, the stock plate or block, and 7 the soft solder. The sheet of plating metal 4 may be precious metal or any other metal by which the block or sheet 6 is to be covered on one or more sides. The sheet of hard solder 5 is a rolled-out sheet of hard solder of uniform thickness. The softer solder may be any solder the point of fusion of which is at a temperature below the point of fusion of the harder solder. Soft solder that will flow at or below 200° Fahrenheit may be used to secure the harder solder to the plating-sheet or to both the plating-sheet and stock block or sheet.

In carrying out my invention the surface of the sheet of plating metal is cleaned to remove oxidation and impurities. The sheet is laid on a heated plate or surface covered with flux and a film of soft solder placed on the fluxed surface of the sheet, and on this soft solder the sheet of harder solder is placed. The sheet of hard solder may now be covered with a film of soft solder and the plating-sheet with the solder secured to the block or sheet of stock metal in the same manner and at as low a temperature as is used in securing the hard solder to the plating-sheet. When the fusing-point of the soft solder is at or about 200° Fahrenheit, a steam-heated plate or table can be used to heat the plating-sheet and melt the solder. The parts can be conveniently handled at this low temperature. As the plating-sheet is protected by the sheet of hard solder secured to it by the softer solder, such prepared plating-sheets may be kept in stock ready to be soldered to the block or sheet to be covered. These sheets of plating metal, one side of which is covered by the sheet of hard solder, may be cut and formed into any desired shape so as to fit the shape of the metal to which they are to be secured by the hard solder.

A number of the so-soldered-together compound ingots, consisting of the plating-sheet 4, the sheet of hard solder 5, and the blocks or sheet 6, secured together by the soft solder, may be set one on top of the other and separated by a sheet of paper and may be clamped together and all placed into the furnace to be fused simultaneously. Ingots so formed by soft soldering the sheet of hard solder between the metal block or sheet and the plating-sheet may be kept in stock ready for fusion, as the surfaces in contact will not be affected by atmospheric action.

In practice I find that when the softer solder nearly approaches the fusing-point of the harder solder, so that when the softer solder runs the harder solder still retains its metallic structure, the best results are obtained for producing ingots for jewelers' stock-plate.

Having thus described my invention, I claim as new and desire to secure by Letters Patent—

1. A sheet of plating metal having a sheet of hard solder secured to it by a softer easier-flowing solder, as described.

2. An ingot for jewelers' stock-plate, consisting of a block or sheet of inferior metal, a sheet of precious metal, and a sheet of hard solder secured between inner surfaces of both metals by a softer solder, as described.

3. The process herein described for making ingots for jewelers' stock-plate, the same consisting in securing a sheet of hard solder to the sheet of precious metal and to the block or sheet of inferior metal by a solder fusing or flowing at a lower temperature than the hard solder, as described.

GEORGE U. MEYER.

Witnesses:
J. A. MILLER, Jr.,
M. F. BLIGH.